United States Patent
Ganesh et al.

(10) Patent No.: US 6,611,824 B1
(45) Date of Patent: Aug. 26, 2003

(54) SYSTEM FOR BEARING-ONLY CONTACT STATE ESTIMATION USING RECURRENT NEURAL NETWORKS

(75) Inventors: Chidambar Ganesh, Bristol, RI (US); Kai F. Gong, Pawtucket, RI (US); Sherry E. Hammel, Little Compton, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 08/792,240

(22) Filed: Jan. 31, 1997

(51) Int. Cl.$^7$ .................................. G06N 3/02
(52) U.S. Cl. ............................. 706/22; 706/15
(58) Field of Search ..................... 395/21; 706/25, 706/24, 22, 20, 10; 700/90; 342/96, 162

(56) References Cited

U.S. PATENT DOCUMENTS

| | | | | | |
|---|---|---|---|---|---|
| 5,276,770 A | * | 1/1994 | Castelaz | ....................... | 706/25 |
| 5,307,289 A | * | 4/1994 | Harris | ......................... | 700/90 |
| 5,345,539 A | * | 9/1994 | Webb | ......................... | 706/24 |
| 5,488,589 A | * | 1/1996 | DeAngelis | .................. | 367/131 |
| 5,537,511 A | * | 7/1996 | DeAngelis et al. | ........... | 706/24 |
| 5,548,683 A | * | 8/1996 | Engel et al. | .................. | 706/20 |
| 5,657,251 A | * | 8/1997 | Fiala | .......................... | 342/162 |
| 5,884,294 A | * | 3/1999 | Kadar et al. | ................... | 706/10 |
| 5,959,574 A | * | 9/1999 | Poore, Jr. | ..................... | 342/96 |

OTHER PUBLICATIONS

Chaudhuri, S.P.; Khanh Luong; Adaptive all–source data fusion system development, Military Communications Conference, 1998. MILCOM 98. Proceedings., IEEE, vol.: 3, Oct. 18–21, 1998, pp.: 924–928 vol. 3.*

Chin–Der Wann; Thomopoulos, S.C.A.; Unsupervised Learning Neural Networks With Applications To Data Fusion, American Control Conference, 1994, vol.: 2 , Jun. 29–Jul. 1, 1994, pp.: 1361–1365.*

Whittington, G.; Spracklen, C.T.; The application of neural networks to tactical and sensor data fusion problems, Artificial Neural Networks, 1989., First IEE International Conference on (Conf. Publ. No. 313) , Oct. 16–18, 1989, pp.: 342–345.*

Sundareshan, M.K.; Amoozegar, F.; Data fusion and non–linear tracking filter implementation using multilayer networks, Neural Networks, 1995. Proceedings., IEEE International Conference on, vol.: 2, Nov./Dec. 1995, pp.: 871–876 vol. 2.*

(List continued on next page.)

*Primary Examiner*—Wilbert L. Starks, Jr.
(74) *Attorney, Agent, or Firm*—James M. Kasischke; Michael F. Oglo; Jean-Paul A. Nasser

(57) ABSTRACT

A system for bearinqs-only contact state estimation in response to target bearing and ownship speed and course information provided for a plurality of observation legs at successive points in time, includes a plurality of neural networks and a data fusion circuit. Each of the neural networks generates range-normalized parameter estimate information for one of the observation legs in response to target bearing and ownship speed and course information for an associated one of the observation legs, provided thereto at each point in time and information generated for the previous point in time. The data fusion system receives the range-normalized parameter estimate information from the neural networks and generates the contact state estimate in response thereto.

6 Claims, 3 Drawing Sheets

OTHER PUBLICATIONS

Patnaik, L.M.; Nair, H.; Abraham, V.; Raghavendra, G.; Singh, S.K.; Srinivasan, R.; Ramchand, K.; Performance evaluation of neural network algorithms for multisensor data fusion in an airborne track while scan radar, Neural Networks, 1996., IEEE Internati.*

Jerome Connor and others, "Recurrent Neural Networks and Robust Time Series Prediction," IEEE Transactions on Neural Networks, v5 n2, Mar. 1994.*

D. G. Lainiotis and others, "Neural Network application to ship position estimation," Florida Institute of Technology, Melbourne Florida, IEEE Ocean '93, Feb. 1993.*

Stefan Kremer, "On the computational power of elman style recurrent neural networks," IEEE Transactions on neural networks, v6 n4, Jul. 1995.*

* cited by examiner

US 6,611,824 B1

SYSTEM FOR BEARING-ONLY CONTACT STATE ESTIMATION USING RECURRENT NEURAL NETWORKS

STATEMENT OF GOVERNMENT INTEREST

The invention described herein may be manufactured by or for the Government of the United States of America for Governmental purposes without the payment of any royalties thereon or therefor.

BACKGROUND OF THE INVENTION (1) Field of the Invention

The invention relates generally to the field of estimation and tracking, and more particularly to systems and methods for bearings-only contact state estimation and target motion analysis for marine applications.

(2) Description of the Prior Art

In the ocean environment, localization and tracking of an acoustic contact from sonar measurements are of considerable interest. The two-dimensional contact state estimation, or target motion analysis, problem captures the fundamental essentials of tracking. Here a moving observer ("ownship") monitors sonar bearings from an acoustic contact ("target") assumed to have constant velocity, one processes those measurements to estimate contact location and velocity.

A fundamental property of a bearings-only target motion analysis is that the process is not completely observable for any single leg of ownship motion. This is clear from the fact that several target trajectories will generate the same bearing-measurement history for a constant velocity observer. The range to the target becomes observable only following a maneuver by the observer. Several estimation techniques have been applied to the bearings-only target motion analysis, with varying results. The differences in methods involve the modeling of the process and the selection of the estimation algorithm. The extended Kalman filter ("EKF") in a Cartesian state-space exhibits divergence problems which yield poor estimates with optimistic uncertainties. The pseudo-linear estimation technique is known to produce biased solutions with optimistic covariances; depending on the scenario geometry, the bias can be severe. The maximum likelihood estimator ("MLE") is one of the present techniques of choice, but it is sensitive to the initialization. A two-stage hierarchical estimation approach has been proposed, but this and the other methods are based on linear filtering and estimation techniques and are approximations to the complex nonlinear nature of the real-world problem.

SUMMARY OF THE INVENTION

It is therefore an object of the invention to provide a new and improved system and method for bearings-only contact state estimation and target motion analysis for marine applications.

In brief summary, in one aspect the invention provides a system for bearings-only contact state estimation in response to target bearing and ownship speed and course (i.e., velocity) information provided for a plurality of observation legs at successive points in time, including a plurality of neural networks and a data fusion circuit. Each of the neural networks generates range-normalized parameter estimate information for one of the observation legs in response to target bearing and ownship course information for an associated one of the observation legs, provided thereto at each point in time and information generated for the previous point in time. The data fusion circuit receives the range-normalized parameter estimate information from the neural networks and generates the contact state estimation in response thereto.

In a further aspect, the invention provides a neural network neural networks for generating range-normalized parameter estimate information for one of the observation legs in response to target bearing and ownship speed and course information for an associated one of the observation legs, provided thereto at each point in time and information generated for the previous point in time. The neural network includes an input layer, a hidden layer and an output layer. The input layer comprises a plurality of input nodes, at least some of the input nodes receiving the bearing information and the ownship speed and course information for the respective one of the observation legs, at least others of the input nodes receiving the delayed intermediate network state information. The hidden layer comprises a plurality of hidden nodes, for receiving the bearing information, the ownship speed and course information and the delayed intermediate network state information from the input nodes and processing it in response to a weight information associated with each input node and respective hidden node in relation to a predetermined non-linear function to generate intermediate network state information. The intermediate network state information generated at each point in time comprises the delayed intermediate network state information for a subsequent point in time. The output layer comprises a plurality of output nodes for generating the range-normalized parameter estimate information in relation to the contact state information generated by the hidden layer at each point in time.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DESCRIPTION OF THE PREFERRED EMBODIMENT

Figure 1:
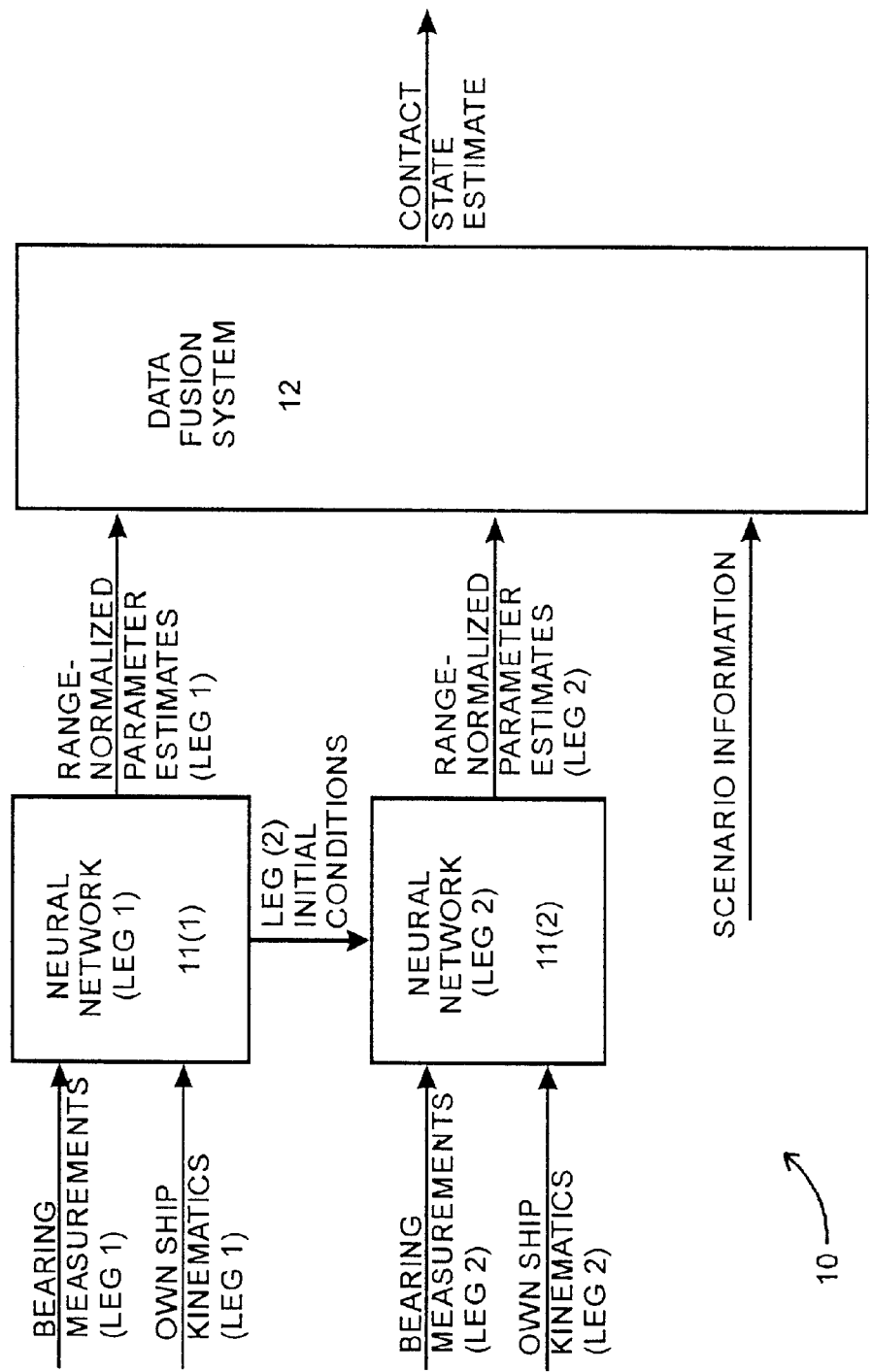
FIG. 1 is a functional block diagram of a system for contact state estimation which incorporates recurrent neural networks constructed in accordance with the invention.

FIG. 1 is a functional block diagram of a system 10 for generating a contact state estimate which incorporates recurrent neural networks. With reference to FIG. 1, the system 10 generates a contact state estimate using includes two primary levels of subsystems, including a first level comprising neural networks 11(1) and 11(2), and a second level comprising a data fusion system 12. Each of the neural networks 11(1) and 11(2) receive bearing measurements and ownship kinematic information concerning the speed and course of the observer ship during one of the observation legs required to facilitate generation of a target state estimate, and generates range-normalized parameter estimates which are provided to the data fusion system 12. The data fusion system, in turn, receives the range-normalized estimates for the respective observation legs and uses that information, along with additional scenario information, to generate a contact state estimate for the target. Operations performed by the data fusion system in generating a contact state estimate for a target in response to the range-normalized parameter estimates provided by the neural networks 11(1) and 11(2) are conventional, and will not be described herein.

As noted above, each of the neural networks 11(1) and 11(2) generates range-normalized parameter estimates in response to bearing measurements and ownship kinematic information (including speed and course information, that is, ship velocity) received during a respective one of a series of observation legs (1) and (2). In addition, the neural network 11(2), which generates the range-normalized parameter estimate for the second observation leg (2), receives initialization information generated by the neural network 11(1) for the first observation leg (1), which it uses in generating the range-normalized parameter estimate for observation leg (2). The structure and operation of the neural networks 11(1) and 11(2) will be described in connection with FIGS. 2 and 3, respectively.

Figure 2:
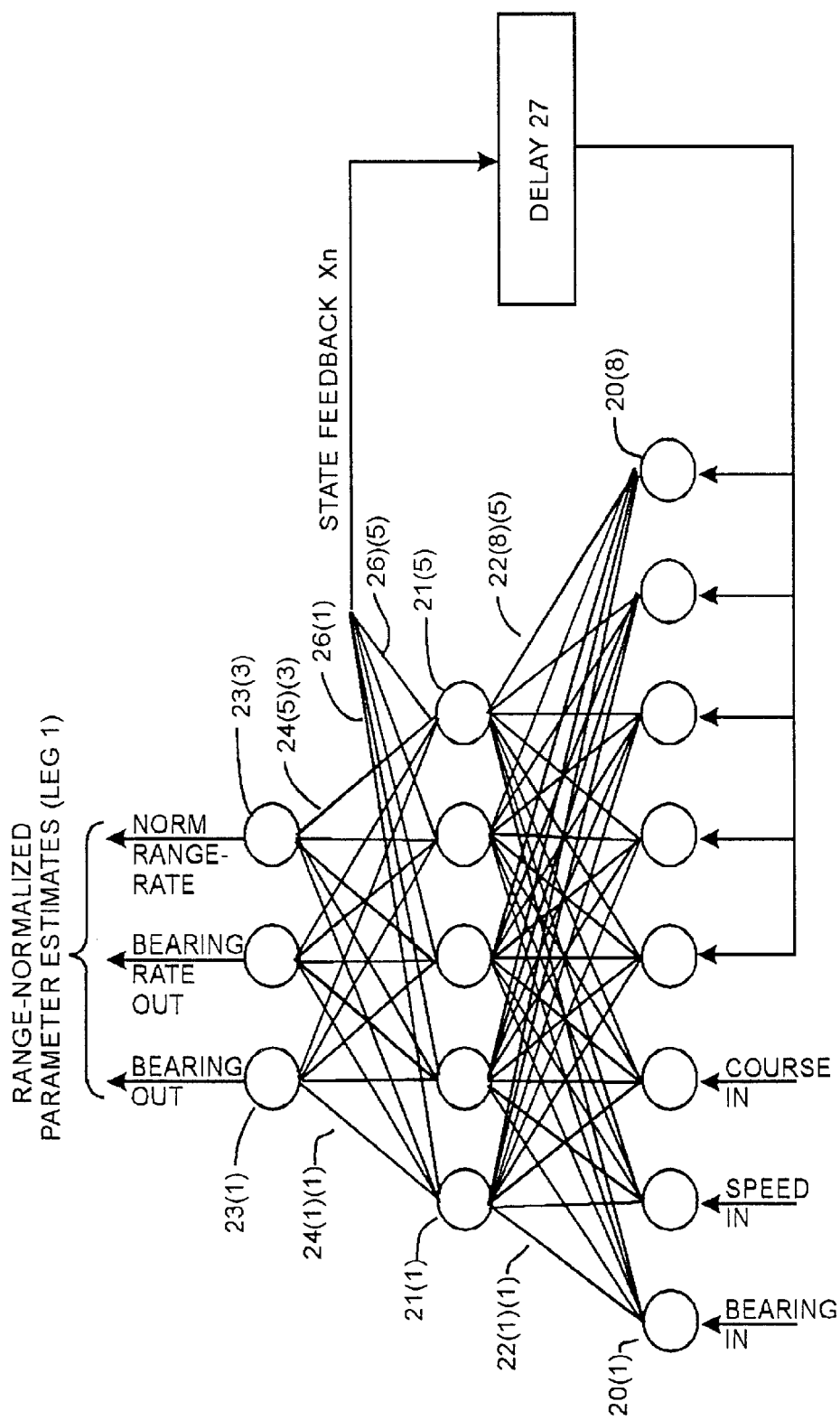
FIGS. 2 and 3 are functional block diagrams of neural networks useful in the system depicted in FIG. 1.

With reference to FIG. 2, neural network 11(1), which generates the range-normalized parameter estimate for observation leg (1), comprises a plurality of nodes organized in an input layer, one hidden layer, and an output layer. The nodes comprising the input layer, comprising nodes 20(1) through 20(8) (generally identified by reference numeral 20($i$)) iteratively receive the bearing and ownship kinematic information, identified FIG. 2 as BEARING IN, SPEED IN, and COURSE IN inputs, at individual nodes 20(1) through 20(3). The BEARING IN input corresponds to the "Bearing Measurements (Leg 1)" input to the neural network 11(1) in FIG. 1, and the SPEED IN and COURSE IN inputs correspond to the "Ownship Kinematics (Leg 1)" input to the neural network 11(1) in FIG. 1.

The input information is provided to the nodes 20($i$) comprising the input layer at a plurality of successive points in time $t_n$ during the first observation leg (1). At each point in time $t_n$, context information, representing information generated by the nodes 21(1) through 21(5) (generally identified by reference numeral 21($h$)) at the previous point in time $t_{n-1}$ is coupled to the other nodes 20(4) through 20(8) of the input layer. The context information is coupled through a delay element, which may comprise, for example, a register, which stores the information generated by the hidden layer nodes 21($h$) at each point in time $t_n$ and provides it to the input layer for the subsequent point in time $t_{n+1}$.

The nodes 20($i$) comprising the input layer are connected to the nodes 21($h$) comprising the hidden layer through a plurality of links 22($i$)($h$). The nodes 21($h$) are all connected to a plurality of output nodes 23(1) through 23(3) (generally identified by reference numeral 23($o$)) through a plurality of links 24($h$)($o$). The nodes 23($o$) generate respective a BEARING OUT, BEARING RATE OUT and NORM RANGE-RATE OUT (normalized range-rate out) value, which comprise the range-normalized parameter estimates (leg 1) shown as being generated by the neural network 11(1) in FIG. 1.

The neural network 11(1) generates the BEARING OUT, BEARING RATE OUT and NORM RANGE-RATE OUT (normalized range-rate out) value from the inputs and context information as follows. If, at time $t_n$, $B_{in}$ represents the bearing in value, $V_n$ represents the (assumed to be constant) ownship speed in value, and $C_n$ represents the (also assumed to be constant) course in value, input state vector $u_n = [B_{in}\ V_n\ C_n]^T$ (where "T" represents the vector transpose operation), then the output state vector generated by the hidden output nodes 21($h$) is $x_n = g(W_{11}U_n + W_{12}X_{n-1})$, where $W_1 = [W_{11}\ W_{12}$ ] is the matrix of weights for the links and the function "g" is selected to be the inverse hyperbolic tangent function $g(z) = \tanh^{-1}(z)$.

The values generated for the present intermediate network state $x_n$ is thus a function of the present input $U_n$ and the values for the previous intermediate network state $X_{n-1}$. Since the previous intermediate network state $X_{n-1}$ depends on the previous input $u_{n-1}$ and the prior intermediate network state $X_{n-2}$, the effect of the feedback is recursive; that is, at any time $t_n$, the intermediate network state $x_n$ depends on the sequence of past values ($X_{n-1}\ X_{n-2}\ \ldots$) for the scenario under consideration. Thus, the neural network 11(1) captures the context of the present measurement by consideration of the past history back to the beginning of the leg.

The output vector generated by the output nodes 23($o$) is generated in a similar fashion by $y_n = g(W_2 x_n)$ where $W_2$ is the matrix of neural network weights for the links 24($h$)($o$) interconnecting the nodes 21($h$) comprising the hidden layer and the nodes 23($o$) comprising the output layer. The output vector generated by the nodes 23($o$) comprising the output layer is given by $y_n = [B_{on}\ B_{rn}\ R_n'/R_n]$, where $B_{on}$ represents the bearing on leg (1), $B_{rn}$ represents the bearing rate on leg (1), and $R_n'/R_n$ represents the normalized range rate on leg (1) at time $t_n$.

Figure 3:
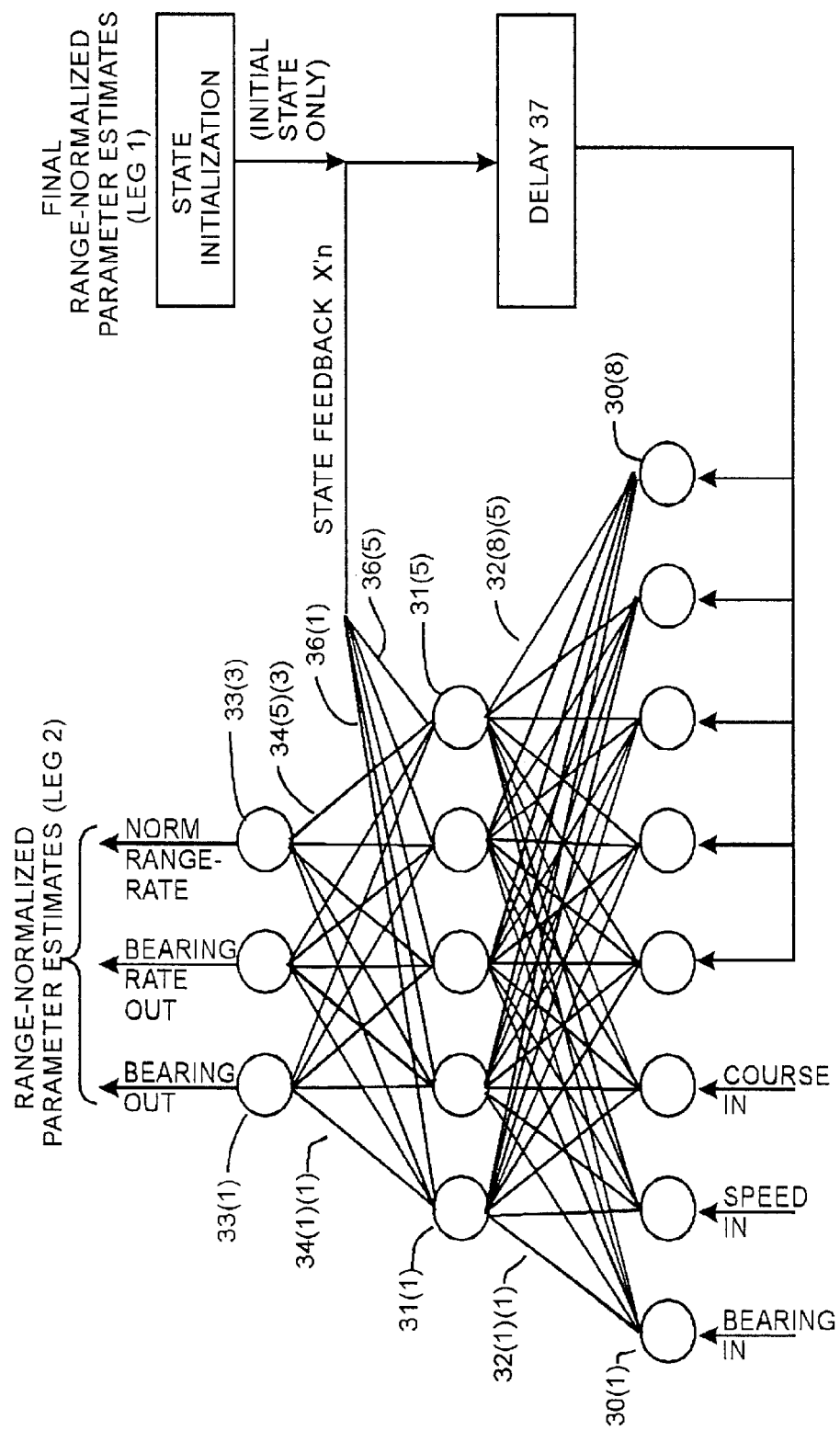

The neural network 11(1) continues to receive bearing measurements and ownship kinematic information for successive points in time until the observation ship changes to a second observation leg (2). At that point, the last state estimate generated by the neural network 11(1) is coupled as an initial input intermediate network state feedback to neural network 11(2) and subsequent. bearing measurements and ownship kinematic information is coupled to that neural network 11(2). The neural network 11(2), which is shown in FIG. 3, is constructed in a similar manner as neural network 11(1), with the additional input to delay 37 providing the initial input intermediate network state feedback, $x_{o2}$. The particular initial state provided by neural network 11(1) to 11(2), through delay 37, is provided by $X'_{o2} = W_2^{-1}(Y_{N1})$, where $W^+_2$ is the pseudo-inverse of the weight matrix $W_2$ and $Y_{N1}$ is the final state estimate generated by neural network 11(1) at the end of observation leg (1).

The neural networks 11(1) and 11(2) can be trained using the well-known conventional back-propagation method of training neural networks, using data generated from simulated underwater tracking scenarios in which trajectory information on the target and ownship vehicles is recorded, and synthetic bearing measurements are collected.

As indicated above, the data fusion system 12 may comprise a neural network or any other suitable mechanism for performing data fusion. The system 12 integrates the information from the neural networks 11(1) and 11(2) to provide a range estimate and update the bearing rate, normalized range-rate and bearing estimates using information from the various observation legs.

The invention provides a number of advantages. In particular, it provides an arrangement for readily processing possibly noisy information in real time, thereby providing a timely response to dynamically evolving scenarios. Since the neural networks 11(1) and 11(2) have recurrent structures, through delays 27 and 37, they can process information through sliding time windows, while maintaining the history of the processing.

The preceding description has been limited to a specific embodiment of this invention. It will be apparent, however, that variations and modifications may be made to the invention, with the attainment of some or all of the advantages of the invention. For example, more than two neural networks can be utilized in the first level if more than two observation legs will be performed, or alternatively a single neural network may be used which has the characteristics of the combination of the two neural networks 11(1) and 11(2) described above. Therefore, it is the object of the appended claims to cover all such variations and modifications as come within the true spirit and scope of the invention.

What is claimed is:

1. A system for bearings-only contact state estimation in response to target bearing and ownship velocity information provided for a plurality of observation legs at successive points in time, said system comprising:

a plurality of neural networks;

each of said neural networks having means for receiving a first set of signals representative of target bearing and ownship speed and course information for an associated one of said observation legs at each point in time and means for processing said first set of signals and intermediate network state information for a previous point in time and for generating therefrom a second set of signals representative of a bearing out, a bearing rate out, and a norm range rate out for one of said observation legs; and a data fusion system for receiving said second set of signals from each of said neural networks and for generating an output signal representative of a contact state estimation.

2. A system as defined in claim 1 wherein:

each said neural network has an input layer comprising a plurality of input nodes, a hidden layer comprising a plurality of hidden nodes, and an output layer comprising a plurality of output nodes;

said input nodes including a number of nodes which comprise said means for receiving said first set of signals and a number of other nodes for receiving said intermediate network state information in a delayed state;

said means for processing said first set of signals and said intermediate network state information in a delayed state including said hidden nodes and said output nodes;

said hidden nodes receiving from said input nodes a third set of signals representative of said bearing information, said ownship speed and course information, and said intermediate network state information in a delayed state and processing said third set of signals and said intermediate network state information in a delayed state in response to a weight information associated with each input node and each respective hidden node in relation to a predetermined non-linear function for generating a fourth set of signals which are supplied to said output nodes and a fifth signal representative of a new intermediate network state information; and said output nodes receiving said fourth set of signals and using said fourth set of signals to generate said second set of signals.

3. A system as defined in claim 2 in which each said neural network further includes a register for receiving said fifth signal and for storing said intermediate network state information generated at each point in time for use as the delayed intermediate network state information for a subsequent point in time.

4. A system as defined in claim 3 wherein said output signal is supplied to a system for tracking a target.

5. A neural network for generating a first set of signals representative of a bearing out, a bearing rate out and a norm range rate out for an observation leg in response to target bearing and ownship speed and course information for an associated observation leg, said neural network comprising:

an input layer comprising a plurality of input nodes, a hidden layer comprising a plurality of hidden nodes, and an output layer comprising a plurality of output nodes;

said input nodes including a number of nodes which comprise means for receiving said target bearing and ownship speed and course information and a number of nodes for receiving a signal representative of intermediate network state information in a delayed state;

said hidden nodes receiving from said input nodes a second set of signals representative of said bearing information, said ownship speed and course information, and said intermediate network state information in a delayed state and processing said second set of signals and said intermediate network state information in a delayed state in response to a weight information associated with each input node and each respective hidden node in relation to a predetermined non-linear function and generating a third set of signals which are supplied to said output nodes and a signal representative of a new intermediate network state information; and said output nodes receiving said third set of signals and and using said third set of signals to generate said first set of signals.

6. A neural network as defined in claim 5 further comprising a register for storing said intermediate network state information generated at each point in time for use as the intermediate network state information in a delayed state for a subsequent point in time.

* * * * *